March 24, 1964 — J. ZWEIBEL ETAL — 3,126,474
FLIGHT PATH ANGLE COMPUTER
Filed Dec. 19, 1960
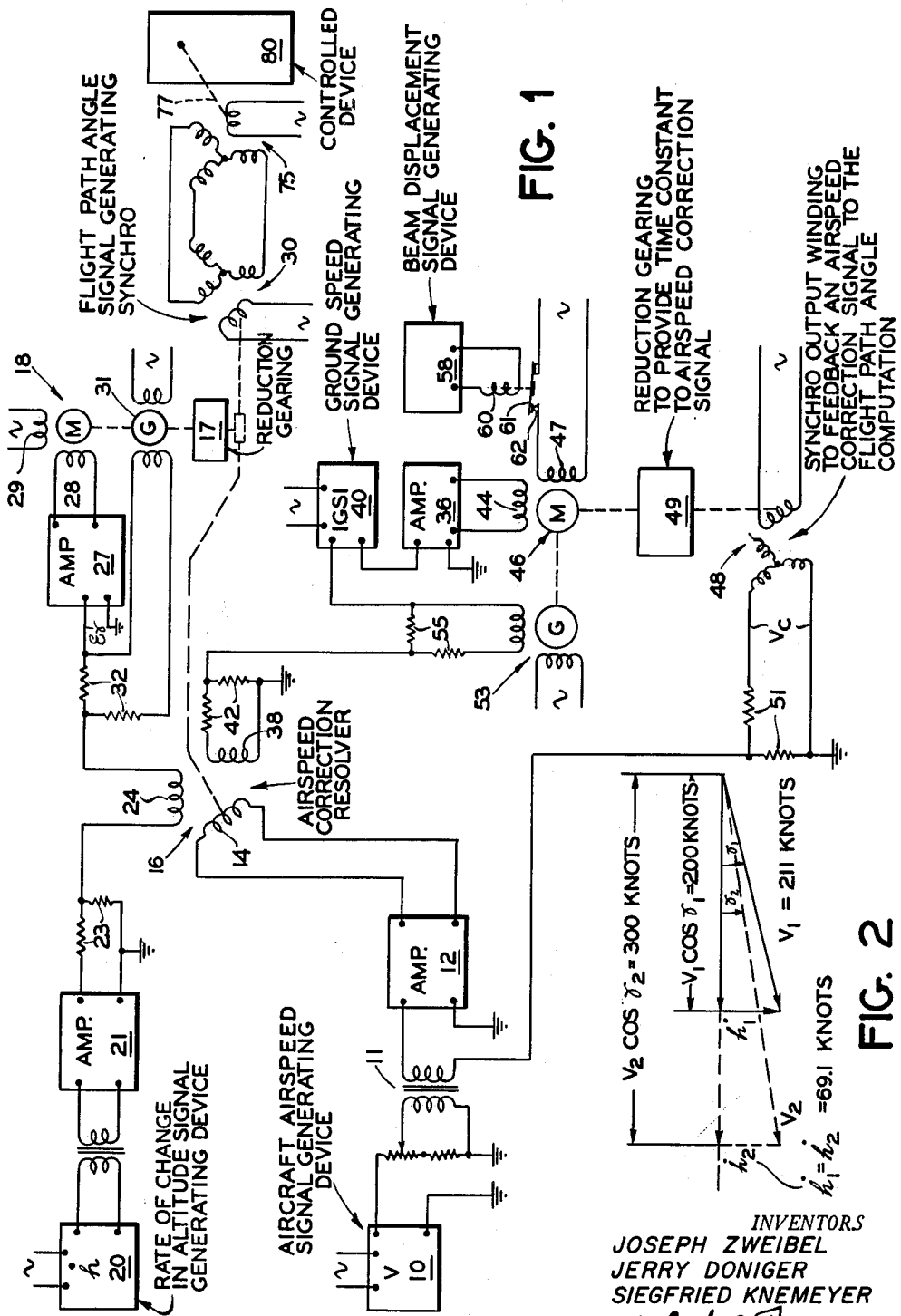
INVENTORS
JOSEPH ZWEIBEL
JERRY DONIGER
SIEGFRIED KNEMEYER
BY Herbert L. Davis
ATTORNEY United States Patent Office 3,126,474
Patented Mar. 24, 1964

3,126,474
FLIGHT PATH ANGLE COMPUTER
Joseph Zweibel, Glen Rock, and Jerry Doniger, Montvale, N.J., and Siegfried Knemeyer, Dayton, Ohio, assignors to The Bendix Corporation, Teterboro, N.J., a corporation of Delaware
Filed Dec. 19, 1960, Ser. No. 76,552
9 Claims. (Cl. 235—151)

This invention relates to an improved flight path angle computer and more particularly to an improved device to provide a pilot of an aircraft with flight path angle information that is continuously ground referenced as during a flight maneuver of the aircraft from a cruising altitude to a lower altitude in approaching the vicinity of an airport.

Heretofore it has been proposed to control the pitch attitude of an aircraft in the operation of the craft in a landing maneuver so that the path along which the craft travels makes a predetermined angle with respect to the geo-horizontal regardless of the craft attitude. Such an angle will hereinafter be referred to as the angle of the craft's flight path or the flight path angle of the aircraft and will be designated generally by the symbol $\gamma$.

An object of the invention is to provide a device by which the flight path angle may be computed from a signal proportional to the rate of change in the altitude of the aircraft and a signal proportional to the true airspeed of the aircraft applied as input parameters to a resolver type servo.

Another object of the invention is to provide a primary resolver type servo loop through which a servo motor is operated so as to compute the flight path angle of the aircraft as an arc sine function of the ratio of the rate of change in the altitude of the aircraft to the airspeed of the aircraft.

Another object of the invention is to provide an airspeed correction signal, supplied by a secondary servo loop, and added to the original airspeed signal in the primary resolver type servo loop to control operation of a servo motor so as to effect flight path angle information that is continually referred to this correction signal.

Further, it is an object of the invention to provide an aircraft flight path angle computer including in operative association with the first mentioned loop circuit a second loop circuit which utilizes a resultant error signal to be applied to an amplifier in the second loop circuit having an error signal input which corresponds to the difference between an airspeed signal developed across a cosine winding of a computing resolver and a signal proportional to the absolute magnitude of the ground speed. In the second loop circuit an auxiliary servo motor is controlled by an output voltage from the amplifier to position the rotor of a synchro and feed back an airspeed correction signal to the computing resolver to effect an error signal in the first loop circuit. Further, a main servo motor controlled by the resultant error signal in the first loop circuit repositions a rotor winding of the resolver to reduce the resultant error signals in the first and second loops to zero in reflecting the computed flight path angle. The main servo motor also serves to position the rotor element of a repeater unit for the purpose of operating a receiver unit which may be arranged so as to control an operative mechanism for presenting to the pilot on a flight director display the computed flight path angle or a command error signal indicative of the deviation of the aircraft from a preselected course.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 1 is a schematic circuit diagram of the invention.

FIGURE 2 is a vectorial illustration of the computation of a flight path angle in which the flight path angle ($\gamma$) is computed from signals proportional to the rate of change in the altitude of the aircraft ($\dot{h}$) and true airspeed (V) plus or minus the airspeed correction signal ($V_C$) applied to the input of a resolver type servo. Thus, the angle $\gamma$ is an arc sin function of the ratio of altitude rate to corrected airspeed i.e. $\gamma = \sin^{-1} \dot{h}/(V \pm V_C)$.

Referring to the schematic circuit diagram of FIGURE 1, there is provided a device 10 of conventional type responsive to the airspeed of an aircraft to develop a signal (V) proportional to the airspeed of the aircraft and applied across a transformer 11 leading to an isolation amplifier 12, the output of which excites a rotor winding 14 of a resolver 16 which is coupled through reduction gearing 17 to a servo motor 18. The reduction gear ratio of the gearing 17 may be, for example, 969 to 1.

There is further provided a device 20 of conventional type responsive to the rate of change in the altitude of the aircraft for developing a rate ($\dot{h}$) signal proportional to the rate of change in the altitude of the aircraft from which the signal is fed into another isolation amplifier 21 of conventional type which serves to amplify the rate signal as well as prevent loading effects. The rate signal is then fed into a voltage divider 23 for a voltage scale factor adjustment and then applied to a sine winding 24 of the resolver 16 so as to act in opposing relation to the airspeed signal induced from the rotor winding 14 across the sine winding 24. Thus a resultant error signal input ($E\gamma$) is applied from the winding 24 to servo motor amplifier 27 corresponding to the formula:

$$E\gamma = \dot{h} - V \sin \gamma$$

The servo motor 18 may be of the conventional two phase type having a control winding 28 and a fixed phase winding 29. The control winding 28 is energized from the output of the amplifier 27 to cause the motor 18 to position through the reduction gearing 17 the rotor winding 14 of the resolver 16 to reduce the error signal to zero while simultaneously adjusting the rotor of a flight path angle generating device or synchro 30. Also, for stability a rate generator 31 on the shaft of motor 18 feeds back negatively a signal through a voltage divider 32 to the servo motor amplifier 27. There is further applied to the airspeed signal generating circuitry of the computer, novel means for effecting an airspeed correction to the generated airspeed signal, as hereafter explained.

Again referring to the schematic diagram of FIGURE 1, in a second loop circuit there is applied an error input signal to a servo motor amplifier 36 of conventional type. The error signal applied to the amplifier 36 is a resultant of the difference between an airspeed signal induced across a cosine winding 38 of the resolver 16 by the rotor winding 14 and a signal $|GS|$ proportional to the absolute magnitude of ground speed developed by a ground speed signal generating device 40 of conventional type.

A voltage divider 42 is so arranged as to equate the scale of the airspeed to ground speed signals. A resultant signal $V \cos \gamma - |GS|$ is applied to the input of the amplifier 36 and in turn through the amplifier 36 to the control winding 44 of a servo motor 46 of a conventional two phase type having a fixed phase winding 47. The servo motor 46 positions the rotor of a synchro 48 through an extremely high ratio reduction gear train 49 having, for example, a ratio of 100,000 to 1 so that the adjustment of the rotor of the synchro 48 is sufficiently slow as to provide approximately a 30 second time constant to the correction signal applied by the synchro 48. The voltage output of the synchro 48 feeds back a signal from a voltage divider 51 equivalent to the desired amount of airspeed correction and adds it to the original airspeed signal required to derive the flight path angle. The airspeed correction signal is required to provide a correction to the flight path angle computation for the effects of longitudinal head or tail winds or gusts on the aircraft during the descent approach and also provide a continuous ground reference to the previously air frame referenced computation. The servo motor 46 also drives a rate generator 53 which feeds back negatively a stabilizing rate signal through a voltage divider 55 to the input of the servo motor amplifier 36.

A vectorial illustration of the operation of the correction signal is shown in FIGURE 2 from which it may be seen, for example, that upon an altitude rate of descent of 69.1 knots, airspeed of 211 knots and assuming a ground speed magnitude of 200 knots, there may be computed the flight path angle $\gamma_1$ as follows:

$$\gamma_1 = \sin^{-1} \frac{h}{V} = \frac{69.1}{211.0} = 19.1°$$

Thus a computed flight path angle $\gamma_1$ of 19.1° would be derived from the respective input parameters as illustrated. At the same altitude rate of descent, a tail wind of 100 knots, in the same sense as the ground speed vector would add to the original cosine component of airspeed thus decreasing the original computed flight path angle $\gamma_1$ to a new value as follows:

$$\gamma_2 = \tan^{-1} \frac{69.1}{300.0} = 13.0°$$

However, in the case of flight paths outside a vertical plane defined by the horizontal projection of a line formed between the range station and the aircraft, the correction process is stopped by removing the fixed phase excitation from the winding 47 of the two phase servo motor 46. This is accomplished by a control device 58 in response to the beam displacement of the aircraft with respect to a pilot's selected track bearing. The beam displacement signal generating device 58 which may be of a conventional type is arranged to produce a D.C. signal in response to such displacement.

An electromagnetic relay winding 60 which senses the magnitude of this beam displacement signal is so arranged as to effectively actuate a spring switch arm 61 normally closing a contact 62. Upon the displacement signal exceeding a predetermined critical value the electromagnetic winding 60 in response thereto causes the switch arm 61 to open contact 62 and thereby effectively open the excitation leads to the fixed phase winding 47 of the two phase servo motor 46. Upon the spring switch arm 62 opening the contact 61 any rotary operation of the servo motor 46 is terminated and the last airspeed correction signal is retained by the last adjusted position of the synchro 48 until the spring switch arm 61 once again closes the contact 62. Adjustment of the airspeed correction signal resumes when the bearing displacement approaches zero at the end of a maneuver or if the pilot resets the desired track bearing to that which the aircraft is flying.

The flight path angle signal generating synchro 30 is electrically connected to windings of a signal receiver synchro 75 of conventional type having a rotor positioned therein so as to follow the position of the rotor of the synchro 30 and in turn position a shaft 77 operatively connected to a controlled device 80.

The position of the shaft 77 represents the corrected flight path angle of the aircraft and the shaft 77 may be utilized to drive a controlled device of conventional type such as digital counter, or a calibrated needle deflection or a continuous tape presentation to visually indicate to the operator of the aircraft the corrected flight path angle information.

The receiver synchro 75 in positioning the flight path angle shaft 77 may operate a controlled device 80 of a conventional structure operative to provide a signal for use in automatically controlling the flight of an aircraft in accordance with the flight path angle of the aircraft or the signal may be utilized to operate a command display on a flight director so that the aircraft may be manually controlled by the pilot in the light of the flight path angle information furnished by the command display.

*Operation*

In the operation of the flight path angle computer of FIGURE 1, it will be noted that as the main servo motor 18 adjusts the position of the flight path angle signal generating synchro 30, the motor 18 effects a corresponding adjustment of the rotor winding 14 of the airspeed correction resolver 16 to a position corresponding to that of the computed flight path angle $\gamma$.

Thus the coupling relation of the rotor winding 14 to the sine winding 24 decreases as the computed flight path angle $\gamma$ decreases while the coupling relation of the rotor winding 14 to the cosine winding 38 increases as the computed flight path angle $\gamma$ decreases. Conversely as the computed flight path angle $\gamma$ increases the coupling relation between the rotor winding 14 and the sine winding 24 increases while the coupling relation of the rotor winding 14 to the cosine winding 38 decreases.

Furthermore in the aforenoted arrangement, the airspeed correction signal synchro 48 is initially adjusted so as to provide a null signal under normal flight operating conditions. Thus under such normal flight operating conditions the adjusted position of the rotor winding 14 in reflecting the computed flight path angle $\gamma$ causes a modified airspeed signal to be induced by the rotor winding 14 into the cosine winding 38 which is differentially balanced by the ground speed signal generated by the device 40 so that there is effected a null error signal.

However, under sustained head wind conditions, the effective airspeed signal induced by the rotor winding 14 into the cosine winding 38 at the adjusted position of the rotor winding 14 may exceed that of the ground speed signal |GS| generated by the device 40, whereupon the resultant error signal will cause the auxiliary servo motor 46 to adjust the rotor of the synchro 48 from the null position in a direction to supply a negative airspeed correction signal. This negative airspeed correction signal is applied to the airspeed signal generated by the device 10 so as to decrease the effective airspeed signal induced into the sine winding 24 by the rotor winding 14 and in turn cause the altitude rate signal differentially combined therewith to effect an error signal for controlling the servo motor 18. The last mentioned error signal will control the servo motor 18 in a sense to cause the rotor winding 14 to be adjusted thereby so as to increase the coupling relation between the rotor winding 14 and the sine winding 24 in reflecting an increase in the computed flight path angle $\gamma$ and in turn wipe out the error signal controlling the main servo motor 18. The latter adjustment of the rotor winding 14 will in turn cause the coupling relation between the rotor winding 14 and the cosine winding 38 to be decreased with the decrease in the corrected airspeed signal so that the effective airspeed signal induced by the rotor winding 14 into the cosine winding 38 is also decreased to in turn wipe out the error signal controlling the auxiliary servo motor 46.

Similarly, under sustained tail wind conditions, the effective airspeed signal induced by the rotor winding 14 into the cosine winding 38 at the adjusted position of the rotor winding 14 may be exceeded by that of the ground speed signal |GS| generated by the device 40, whereupon the resultant error signal will cause the auxiliary servo motor 46 to adjust the rotor of the synchro 48 in an opposite direction from the null position so as to supply a positive air speed correction signal. This positive airspeed correction signal is added to the airspeed signal generated by the device 10 so as to increase the effective airspeed signal induced into the sine winding 24 by the rotor winding 14. The latter effective airspeed signal differentially combined with the altitude rate signal will effect an error signal for controlling the servo motor 18 in a sense to cause the rotor winding 14 to be adjusted so as to decrease the coupling relation between the rotor winding 14 and the sine winding 24 in reflecting a decrease in the computed flight path angle $\gamma$ and in turn wipe out the error signal controlling the main servo motor 18. The latter adjustment of the rotor winding 14 will in turn cause the coupling relation between the rotor winding 14 and the cosine winding 38 to be increased with the increase in the corrected airspeed signal so that the effective airspeed signal induced by the rotor winding 14 into the cosine winding 38 is also increased to in turn wipe out the error signal controlling the auxiliary servo motor 46.

Furthermore, the foregoing adjustment of the airspeed correction synchro 48 by the auxiliary servo motor 46 is effected through the extremely high ratio reduction gear train 49 so that changes in the airspeed correction signal are applied at a sufficiently slow rate as to provide a sufficient time constant to the correction signal to effect stability of control and a control unaffected by transitory fluctuation in flight conditions such as sudden shifts in gusts of wind.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Apparatus for computing the flight path angle of an aircraft comprising means for supplying a first signal responsive to the rate of change in altitude of the aircraft, means for supplying a second signal responsive to the airspeed of the aircraft, means for differentially coupling the first and second signals to effect a first resultant error signal, a main servo motor means controlled by said first resultant error signal, means for supplying a third signal proportional to the absolute magnitude of the speed of travel of the aircraft relative to ground, means for differentially coupling the second and third signals to effect a second resultant error signal, an auxiliary servo motor means controlled by said second resultant error signal, means for supplying a variable airspeed correction signal, means for applying said airspeed correction signal to said second signal, means to operatively connect said auxiliary servo motor means to said variable airspeed correction signal supply means in such a manner that said auxiliary servo motor means may vary said airspeed correction signal in a sense tending to diminish said second resultant error signal, means to operatively connect said main servo motor means to said first and second mentioned coupling means so as to adjust in opposite senses the differential coupling of the first and second signals and the differential coupling of the second and third signals in a sense tending to diminish the first and second resultant error signals to zero, and other control means simultaneously driven by said main servo motor means to a position corresponding to the computed flight path angle of the aircraft.

2. The combination defined by claim 1 including reduction speed driving means operatively connecting said auxiliary servo motor means to said variable airspeed correction signal supply means so as to provide a time delay in the application of the airspeed correction signal to said second signal sufficient to effect stability of control under transitory fluctuations in prevailing wind conditions.

3. Apparatus for deriving a measure of the flight path angle of an aircraft, comprising means for generating a first signal in accordance with the rate of change in altitude of the aircraft, means for generating a second signal in accordance with the airspeed of the aircraft, means for generating a third signal proportional to the absolute magnitude of the speed of travel of the aircraft relative to ground, means for generating a fourth variable airspeed correction signal, means for coupling the second and fourth signals for effecting a fifth corrected airspeed signal, a resolver including sine and cosine windings and a rotary winding inductively coupled thereto, means for applying said first signal to said sine winding, means for applying said fifth signal to said rotary winding, said rotary winding differentially coupling said first and fifth signals in said sine winding to effect a resultant error signal, a main servo motor means controlled by said resultant error signal, means for applying said third signal to said cosine winding, said rotary winding differentially coupling said third and fifth signals in said cosine winding to effect another resultant error signal, auxiliary servo motor means controlled by said other resultant error signal, time delay means to operatively connect said auxiliary servo motor means to said variable airspeed correction signal generating means in such a manner that said auxiliary servo motor means may vary said fourth airspeed correction signal and thereby the fifth corrected airspeed signal in a sense to diminish said other resultant error signal, means to operatively connect said main servo motor means to said rotary winding to adjustably position said rotary winding relative to said sine and cosine windings so as to vary the differential coupling of the first and fifth signals in said sine winding in a sense to diminish the first mentioned resultant error signal to zero while simultaneously varying the differential coupling of the third and fifth signals in said cosine winding in a sense to diminish the other resultant error signal, and other control means driven by said main servo motor to a position corresponding to the derived measure of the flight path angle of the aircraft.

4. Apparatus for computing the flight path angle of an aircraft comprising means for supplying a first signal responsive to the rate of change in altitude of the aircraft, means for supplying a second signal responsive to the airspeed of the aircraft, means for supplying a third signal proportional to the speed of travel of the aircraft relative to ground, means for differentially coupling the first and second signals to effect a first resultant error signal and the second and third signals to effect a second resultant error signal, main servo motor means controlled by said first resultant error signal to adjust said differential coupling means to diminish the first and second error signals, an auxiliary servo motor means controlled by said second resultant error signal, and airspeed correction signal means operatively controlled by said auxiliary servo motor means for applying a correction signal to said second signal under varying flight conditions.

5. Apparatus for determining the angle of the flight path of an aircraft, comprising means for generating a signal in accordance with speed of flight of the aircraft relative to the air, other means for generating another signal in accordance with rate of change in altitude of the aircraft, servo motor means operative by said signals, means driven by said motor means to a position corresponding to a computed flight path angle of the aircraft, and means responsive to speed of flight of the aircraft relative to ground for supplying a correction signal to said servo motor means to compensate for differences in the relative air and ground speeds of the aircraft.

6. The combination defined by claim 5 including time delay means for applying the correction signal to said servo motor means so that the compensation for differences in the relative air and ground speeds of the aircraft may be unaffected by transitory fluctuations in prevailing flight conditions.

7. The combination defined by claim 5 including a beam displacement responsive means for generating a signal upon the aircraft deviating from a selected course of flight, and means operative by the last mentioned signal for rendering said correction signal supply means non-responsive to the speed of flight of the aircraft relative to ground upon the aircraft deviating from the selected course of flight.

8. Apparatus for determining the angle of flight path of an aircraft comprising means for generating a signal in accordance with speed of flight of the aircraft relative to the surrounding air, other means for generating another signal in accordance with rate of change in altitude of the aircraft, servo motor means operative by said signals, means driven by said motor means to a position corresponding to a computed flight path angle of the aircraft, means responsive to speed of flight of the aircraft relative to ground for supplying a correction signal, time delay means for applying the correction signal to said servo motor means to compensate for differences in the relative air and ground speeds of the aircraft unaffected by transitory fluctuations in prevailing flight conditions, signal generating means responsive to deviation of an aircraft from a selected course of flight, and means operative by the last mentioned means for rendering said time delay means ineffective to apply the correction signal upon the aircraft deviating from the selected course of flight.

9. Apparatus for deriving a measure of the flight path angle of an aircraft, comprising means for generating a first signal in accordance with the rate of change in altitude of the aircraft, means for generating a second signal in accordance with the airspeed of the aircraft, means for generating a third signal proportional to the absolute magnitude of the speed of travel of the aircraft relative to ground, means for generating a fourth variable airspeed correction signal, means for coupling the second and fourth signals for effecting a fifth corrected airspeed signal, a resolver including sine and cosine windings and a rotary winding inductively coupled thereto, means for applying said first signal to said sine winding, means for applying said fifth signal to said rotary winding, said rotary winding differentially coupling said first and fifth signals in said sine winding to effect a resultant error signal, a main servo motor means controlled by said resultant error signal, means for applying said third signal to said cosine winding, said rotary winding differentially coupling said third and fifth signals in said cosine winding to effect another resultant error signal, auxiliary servo motor means controlled by said other resultant error signal, time delay means to operatively connect said auxiliary servo motor means to said variable airspeed correction signal generating means in such a manner that said auxiliary servo motor means may vary said fourth airspeed correction signal and thereby the fifth corrected airspeed signal in a sense to diminish said other resultant error signal, means to operatively connect said main servo motor means to said rotary winding to adjustably position said rotary winding relative to said sine and cosine windings so as to vary the differential coupling of the first and fifth signals in said sine winding in a sense to diminish the first mentioned resultant error signal to zero while simultaneously varying the differential coupling of the third and fifth signals in said cosine winding in a sense to diminish the other resultant error signal, other control means driven by said main servo motor to a position corresponding to the derived measure of the flight path angle of the aircraft, and a beam displacement responsive means for generating a signal upon the aircraft deviating from a selected course of flight, and relay means operative by the last mentioned signal for rendering said auxiliary servo motor means inoperative upon the aicraft deviating from the selected course of flight.

References Cited in the file of this patent
UNITED STATES PATENTS

| 2,849,184 | Frederick et al. | Aug. 26, 1958 |

FOREIGN PATENTS

| 815,137 | Great Britain | June 17, 1959 |